(12) United States Patent
Glovier

(10) Patent No.: US 11,202,402 B2
(45) Date of Patent: Dec. 21, 2021

(54) SYSTEM AND METHOD FOR IDENTIFYING PLUGGING OF GROUND ENGAGING TOOLS BASED ON WIRELESS SIGNAL DETECTION

(71) Applicant: CNH Industrial America LLC, New Holland, PA (US)

(72) Inventor: Scott Glovier, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 217 days.

(21) Appl. No.: 16/521,099

(22) Filed: Jul. 24, 2019

(65) Prior Publication Data

US 2021/0022284 A1    Jan. 28, 2021

(51) Int. Cl.
*A01B 76/00* (2006.01)
*G07C 5/08* (2006.01)

(52) U.S. Cl.
CPC .............. *A01B 76/00* (2013.01); *G07C 5/085* (2013.01); *G07C 5/0816* (2013.01)

(58) Field of Classification Search
CPC ....... A01B 76/00; A01B 71/08; A01B 49/027; A01B 29/06; A01B 29/048; G07C 5/0816; G07C 5/085
See application file for complete search history.

(56) References Cited

U.S. PATENT DOCUMENTS

| | | | |
|---|---|---|---|
| 8,408,149 B2 | 4/2013 | Rylander | |
| 9,485,900 B2 | 11/2016 | Connell et al. | |
| 9,629,304 B2 | 4/2017 | Zielke | |
| 9,781,916 B2 * | 10/2017 | Preheim | ................. B05B 12/08 |
| 10,076,072 B2 | 9/2018 | Steinlage et al. | |
| 10,255,670 B1 * | 4/2019 | Wu | ........................ H04N 7/183 |

(Continued)

FOREIGN PATENT DOCUMENTS

| | | |
|---|---|---|
| DE | 102017112224 A1 | 12/2018 |
| JP | 2019/103431 A | 6/2019 |
| WO | WO2018020310 | 2/2018 |

OTHER PUBLICATIONS

International Search Report and Written Opinion issued in corresponding Application No. PCT/US2020/042703 dated Oct. 29, 2020 (39 pages).

*Primary Examiner* — Mussa A Shaawat
(74) *Attorney, Agent, or Firm* — Rebecca L. Henkel; Rickard K. DeMille

(57) ABSTRACT

A system for identifying plugging of ground engaging tools of an agricultural implement may include a ground engaging tool configured to be supported by an agricultural implement and a signal transmission device provided in operative association with the ground engaging tool, with the signal transmission device being configured to transmit wireless signals. The system may also include an antenna spaced apart from the signal transmission device and configured to receive the wireless signals transmitted from the signal transmission device, and a controller communicatively coupled to the antenna. The controller is configured to determine when the ground engaging tool is experiencing a plugged condition based at least in part on at least one of an attenuation parameter of the wireless signals received by the antenna from signal transmission device or a lack of wireless signals received by the antenna from signal transmission device.

20 Claims, 6 Drawing Sheets

(56) References Cited

U.S. PATENT DOCUMENTS

| | | | |
|---|---|---|---|
| 2013/0008361 A1* | 1/2013 | Trevino | A01B 79/005 |
| | | | 111/120 |
| 2015/0101519 A1* | 4/2015 | Blackwell | A01B 79/00 |
| | | | 111/200 |
| 2015/0257334 A1* | 9/2015 | Wolters | A01M 7/0089 |
| | | | 111/118 |
| 2015/0296701 A1* | 10/2015 | Anderson | A01B 79/00 |
| | | | 172/2 |
| 2015/0305224 A1* | 10/2015 | Casper | A01B 79/00 |
| | | | 701/50 |
| 2017/0086363 A1* | 3/2017 | Tribelhorn | A01C 23/007 |
| 2018/0128933 A1 | 5/2018 | Koch et al. | |
| 2018/0139884 A1 | 5/2018 | Karstens et al. | |
| 2018/0206393 A1 | 7/2018 | Stoller et al. | |
| 2018/0279541 A1 | 10/2018 | Kovach | |
| 2018/0279542 A1 | 10/2018 | Kovach | |
| 2018/0279543 A1 | 10/2018 | Kovach | |
| 2018/0352718 A1* | 12/2018 | Kovach | A01B 49/027 |
| 2019/0174667 A1* | 6/2019 | Gresch | A01B 61/044 |
| 2020/0037519 A1* | 2/2020 | Wonderlich | B05B 12/085 |
| 2020/0100419 A1* | 4/2020 | Stanhope | A01B 63/111 |
| 2020/0107498 A1* | 4/2020 | Anderson | A01C 5/064 |
| 2020/0128719 A1* | 4/2020 | Harmon | A01B 79/005 |
| 2020/0305335 A1 | 10/2020 | Schoeny et al. | |
| 2020/0355667 A1* | 11/2020 | Schoeny | A01B 79/005 |
| 2020/0387720 A1* | 12/2020 | Stanhope | A01C 7/203 |
| 2020/0404829 A1* | 12/2020 | Knobloch | A01B 19/10 |
| 2020/0404830 A1* | 12/2020 | Ferrari | A01B 63/1112 |
| 2020/0404833 A1* | 12/2020 | Stanhope | A01B 63/24 |

* cited by examiner

SYSTEM AND METHOD FOR IDENTIFYING PLUGGING OF GROUND ENGAGING TOOLS BASED ON WIRELESS SIGNAL DETECTION

FIELD OF THE INVENTION

The present disclosure generally relates to agricultural implements and, more particularly, to systems and methods for identifying plugging of ground engaging tools of an agricultural implement, such as rolling basket assemblies, based on wireless signal detection.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow discs, leveling discs, rolling baskets, shanks, tines, and/or the like. Such ground engaging tool(s) loosen and/or otherwise agitate the soil to prepare the field for subsequent planting operations.

During tillage operations, field materials, such as residue, soil, rocks, mud, and/or the like, may become trapped or otherwise accumulate on and/or within ground engaging tools or between adjacent ground engaging tools. For instance, material accumulation will often occur around the exterior of a basket assembly (e.g., on the blades or bars of the basket assembly) and/or within the interior of the basket assembly. Such accumulation of field materials may prevent the basket assembly from performing in a desired manner during the performance of a tillage operation. In such instances, it is often necessary for the operator to take certain corrective actions to remove the material accumulation. However, it is typically difficult for the operator to detect or determine a plugged condition of a basket assembly or any other suitable ground engaging tool(s) when viewing the tools from the operator's cab.

Accordingly, an improved system and method for identifying plugging of ground engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for identifying plugging of ground engaging tools of an agricultural implement. The system includes a ground engaging tool configured to be supported by an agricultural implement and a signal transmission device provided in operative association with the ground engaging tool, with the signal transmission device being configured to transmit wireless signals. The system also includes an antenna spaced apart from the signal transmission device and configured to receive the wireless signals transmitted from the signal transmission device, and a controller communicatively coupled to the antenna. The controller is configured to determine when the ground engaging tool is experiencing a plugged condition based at least in part on at least one of an attenuation parameter of the wireless signals received by the antenna from signal transmission device or a lack of wireless signals received by the antenna from signal transmission device.

In another aspect, the present subject matter is directed to an agricultural implement including a frame, a basket assembly configured to be supported by the frame, and a signal transmission device provided in operative association with the basket assembly, with the signal transmission device being configured to transmit wireless signals. The implement also includes an antenna spaced apart from the signal transmission device and configured to receive the wireless signals transmitted from the signal transmission device, and a controller communicatively coupled to the antenna. The controller is configured to determine whether the basket assembly is experiencing a plugged condition by identifying when the wireless signals transmitted from the signal transmission device to the antenna are at least one of attenuated or blocked.

In a further aspect, the present subject matter is directed to a method for identifying plugging of ground engaging tools of an agricultural implement. The method includes receiving wireless signals from a signal transmission device provided in operative association with a ground engaging tool of an agricultural implement as the agricultural implement is being traversed across a field to perform an agricultural operation. In addition, the method includes determining, with a computing device, whether the wireless signals transmitted from the signal transmission device are being attenuated or blocked prior to receipt of such wireless signals, and identifying, with the computing device, that the ground engaging tool is experiencing a plugged condition in response to the determination that the signals are being attenuated or blocked.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
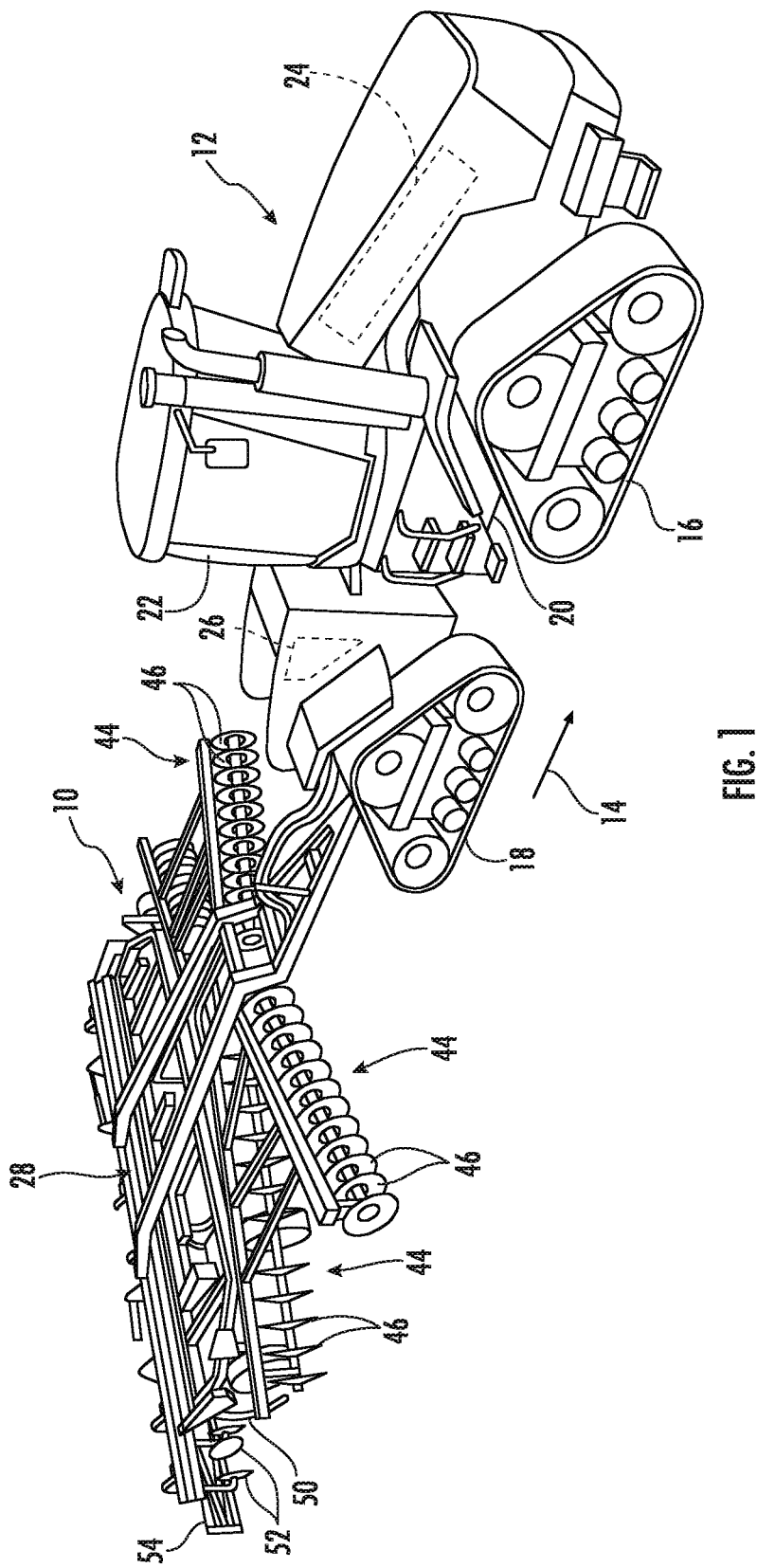
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for identifying plugging of ground engaging tools of an agricultural implement. Specifically, in several embodiments, the disclosed system may include one or more wireless one or more wireless signal transmission devices (e.g., RFID tags) configured to wirelessly transmit signals to one or more associated signal receivers or antennas. In general, the signal transmission device(s) may be configured to be installed on, within, and/or adjacent to an associated ground engaging tool at a suitable location that allows the transmission device(s) to transmit wireless signals to the antenna(s) during normal, non-plugged operation of the ground engaging tool. However, with accumulation of field materials on, within, and/or adjacent to the ground engaging tool, the wireless signals transmitted from the transmission device(s) to the antenna will become degraded or attenuated (or may be completed blocked) as the signals pass through the accumulated material. By detecting the attenuation of the signals (or the lack of any signals due to signal blockage), an associated controller or computing device of the system may infer or determine that the ground engaging tool is currently plugged or experiencing a plugged condition. For instance, in one embodiment, the controller may be configured to assess an attenuation parameter associated with the wireless signals received by the antenna (e.g., signal strength) to determine the existence of material accumulation on, within, and/or adjacent to the ground engaging tool. Once it is determined that the ground engaging tool is experiencing a plugged condition, an appropriate control action may then be executed, such as by notifying the operator of the plugged condition or by performing an automated control action.

Figure 2:
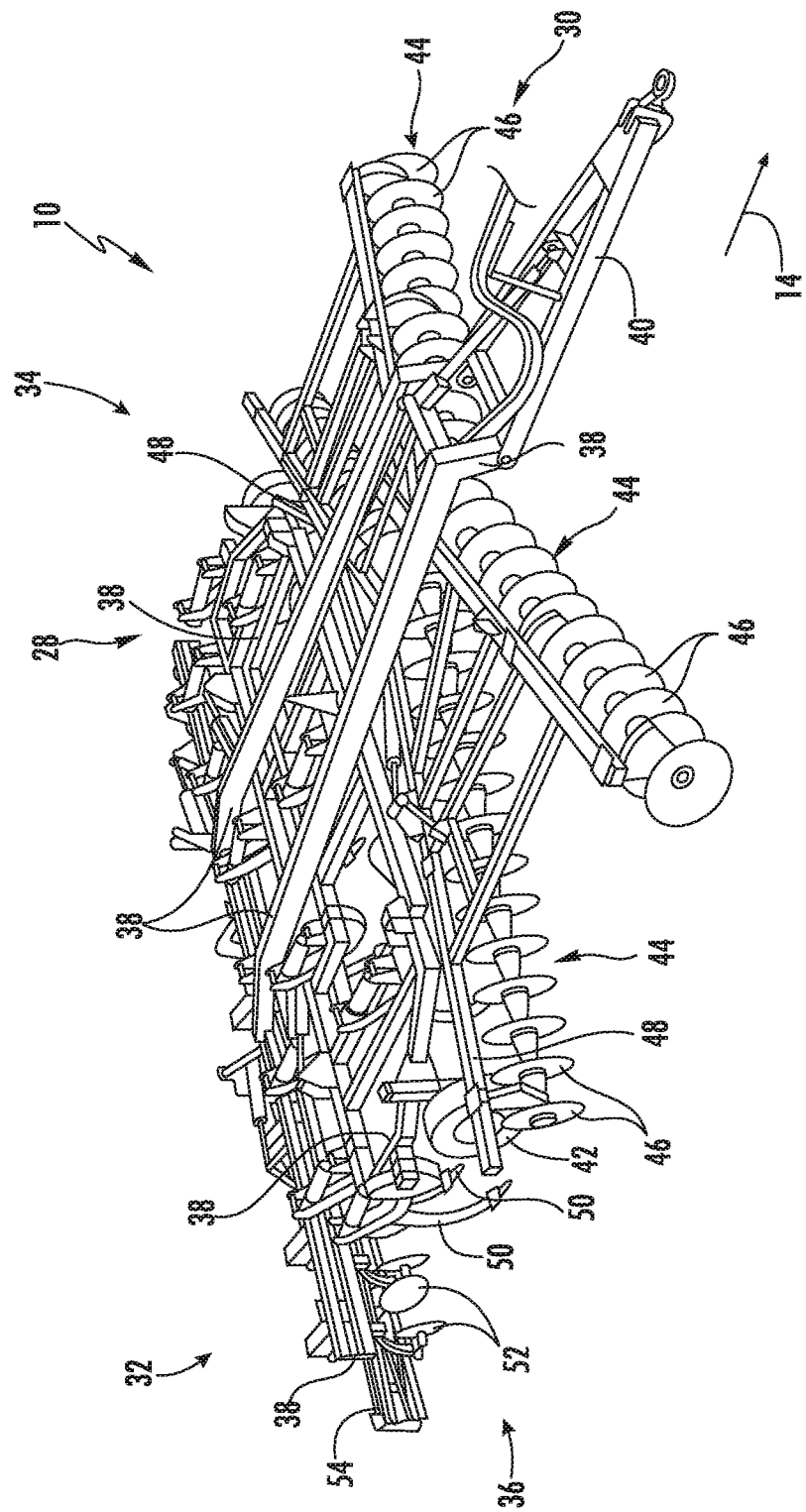
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically. FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support various ground engaging tools. For instance, the frame 28 may support one or more gangs or sets 44 of disc blades 46. Each disc blade 46 may be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support one or more finishing tools, such as a plurality of leveling blades 52 and/or rolling (or crumbler) basket assemblies 54. However, in other embodiments, any other suitable ground-engaging tools may be coupled to and supported by the implement frame 28, such as a plurality closing discs.

Figure 3:
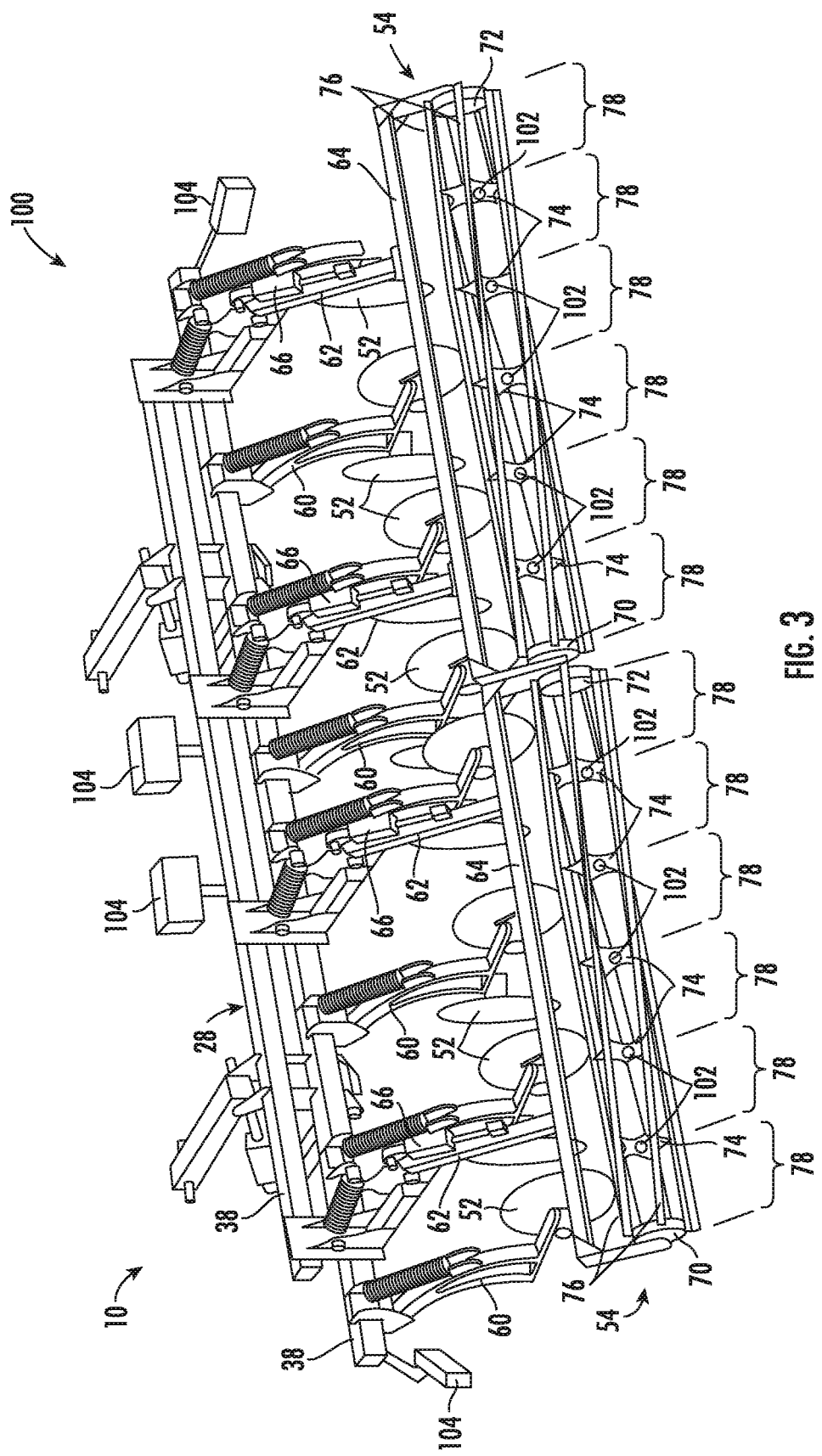
FIG. 3 illustrates a partial perspective view of finishing tools positioned at an aft end of the implement shown in FIGS. 1 and 2, particularly illustrating one embodiment of a system for identifying plugging of ground engaging tools provided in operative association with the implement in accordance with aspects of the present subject matter.

Referring now to FIG. 3, a partial, perspective view of the aft end of the implement 10 shown in FIGS. 1 and 2 is illustrated in accordance with aspects of the present subject matter, particularly illustrating a portion of the finishing tools 52, 54 of the implement 10. As shown, the various finishing tools 52, 54 may be coupled to or supported by the implement frame 28, such as by coupling each tool to a toolbar or laterally extending frame member 38 of the frame 38. For instance, as shown in FIG. 3, a blade support arm 60 may be coupled between a given frame member 38 and each leveling blade 52 or set of leveling blades 52 to support the blades 52 relative to the frame 28. Similarly, one or more basket support arms 62 may be coupled between a given frame member 38 and an associated mounting yoke or basket hanger 64 for supporting each basket assembly 54 relative to the frame 28. Additionally, as shown in FIG. 3, in one embodiment, a basket actuator 66 (e.g., a hydraulic or pneumatic cylinder) may be coupled to each basket support arm 62 to allow the down force or down pressure applied to each basket assembly 54 to be adjusted. The basket actuators 66 may also allow the basket assemblies 54 to be raised off the ground, such as when the implement 10 is making a headland turn and/or when the implement 10 is being operated within its transport mode.

In several embodiments, each basket assembly 54 includes a plurality of support plates 70, 72, 74 configured to support a plurality of blades or bars 76 spaced circumferentially about the outer perimeter of the basket. For instance, as shown in FIG. 3, each basket assembly 54 includes first and second end plates 70, 72 positioned at the opposed lateral ends of the basket assembly 54 and a plurality of inner support plates 74 spaced apart laterally from one another between the end plates 70, 72. Lateral basket sections 78 are generally defined between each pair of adjacent support plates 70, 72, 74, with each basket section 78 being generally characterized by a hollow or substantially hollow interior area surrounded by the lateral portions of the bars 76 extending between the respective pair of adjacent support plates 70, 72, 74. As is generally understood, the end plates 70, 72 may be rotatably coupled to the corresponding basket hanger 64 (which, in turn, is coupled to the associated bracket support arm(s) 62) via bearings to allow the basket assembly 54 to rotate relative to the hanger/arm 64, 62 as implement 10 is being moved across the field. Additionally, in the illustrated embodiment, the bars 76 of each basket assembly 54 are configured as formed bars. However, in other embodiments, the bars 76 may have any other suitable configuration, such as flat bars, round bars, and/or the like.

Moreover, in accordance with aspects of the present subject matter, FIG. 3 also illustrates components of one embodiment of a system 100 for identifying plugging of ground engaging tools of an agricultural implement. Specifically, in the illustrated embodiment, the system 100 is shown as being configured for use in identifying a plugged condition(s) of the basket assemblies 54. However, in other embodiments, the system 100 may be utilized to identify a plugged condition of any other suitable ground engaging tool(s), such as blades, disks, shanks, and/or the like.

As shown in FIG. 3, the system 100 includes one or more wireless signal transmission devices 102 (also referred to herein simply as "signal transmitters") configured to wirelessly transmit signals to one or more associated signal receivers or antennas 104. In general, the signal transmitter(s) 102 may be configured to be positioned on or within the basket assembly 54 at a suitable location that allows the transmitter(s) to transmit wireless signals to the associated antenna(s) during normal, non-plugged operation of the basket assembly 54. However, with accumulation of field materials on and/or within the basket assembly 54, the wireless signals transmitted from the signal transmitter(s) 102 to the antenna 104 will become degraded or attenuated (or may be completed blocked) as the signals pass through the accumulated material. By detecting the attenuation of the signals (or the lack of any signals due to signal blockage), an associated controller or computing device 106 (FIGS. 4 and 5) of the system 10 may infer or determine that the basket assembly 54 is currently plugged or experiencing a plugged condition. For instance, in one embodiment, the controller 106 may be configured to assess an attenuation parameter associated with the wireless signals received by the antenna 104 (e.g., signal strength) to determine the existence of material accumulation on or within the basket assembly 54. Once it is determined that the basket assembly 54 is experiencing a plugged condition, an appropriate control action may then be executed, such as by notifying the operator of the plugged condition or by performing an automated control action.

In several embodiments, one or more of the signal transmitters 102 may be configured to be installed on or within each basket assembly 54, such as by coupling a signal transmitter(s) 102 to one or more of the support plates 70, 72, 74 of the basket assembly 54. For instance, in one embodiment, a signal transmitter(s) 102 may be coupled to each inner support plate 74 and/or each end plate 70, 72 such that at least one signal transmitter is positioned within each lateral basket section 78 of the associated basket assembly 54. As will be described below with reference to FIG. 4, in a particular embodiment of the present subject matter, a pair of signal transmitter(s) 102 may be coupled to each inner support plate 74, with one signal transmitter 102 being secured to one side or face of each support plate 74 and another signal transmitter 102 being secured to the opposed side or face of the support plate 74. In another embodiment, the signal transmitter(s) 102 may be coupled to or supported by any other suitable component(s) of the basket assembly 54 that allows the transmitter(s) 102 to function as described herein, such as one or more of the bars 76, an internal support shaft extending through and/or between the support plates 70, 72, 74 (if applicable), and/or any other suitable basket component.

As indicated above, each signal transmitter 102 may be configured to transmit a wireless signal(s) that can be detected by an associated signal receiver(s) or antenna 104 of the disclosed system 100. For instance, in one embodiment, each signal transmitter 102 may be configured as an RFID tag, such as an active RFID tag or a passive RFID tag. In such an embodiment, the associated antenna(s) 104 may form part of or may be communicatively coupled to a suitable RFID interrogator or reader. For instance, if the signal transmitters 102 correspond to passive RFID tags, the antenna(s) 104 may form part of or may be communicatively coupled to an active RFID reader configured to actively transmit interrogation signals to each associated RFID tag and receive the corresponding reply signals from the tag(s). Similarly, if the signal transmitters 102 correspond to active RFID tags, the antenna(s) may form part of or may be communicatively coupled to a passive RFID reader configured to receive the radio signals transmitted from the tags.

In other embodiments, each signal transmitter 102 may be configured as any other suitable component(s) and/or device(s) configured to transmit wireless signals for receipt by an associated antenna(s) 104 using any suitable wireless communication protocol(s) or other suitable wireless signal transmission technology. For instance, in some embodiments, the signal transmitters 102 may be configured to transmit short-range wireless signals using Bluetooth, Near-Field Communications, WiFi, Zigbee, RuBee, and/or any other suitable short-range wireless communication protocol. Suitable wireless signals configured to be transmitted by the signal transmitters 102 (and received by the associated antenna(s)) may include, but are not limited to, signals in the form of radio waves, magnetic waves, other forms of electromagnetic waves, and/or the like.

Moreover, in several embodiments, the antenna(s) 104 may be configured to be installed at any suitable location relative to the signal transmitter(s) 102 that allows the antenna(s) 104 to receive the wireless signals transmitted from the transmitter(s) 102 during normal, un-plugged operation. For instance, when each signal transmitter 102 has a given wireless transmission range, the antenna(s) 104 may be installed at any suitable location on the implement 10 that falls within such wireless transmission range. As shown in the illustrated embodiment, each antenna 104 is mounted to a portion of the implement frame 28 extending along the aft end of the implement 10, such as on the toolbar(s) or frame member(s) 38 to which the leveling discs 52 and/or basket assemblies 54 are coupled. However, in other embodiments, the antennas 104 may be mounted to any other suitable component of the implement 10 within the wireless transmission range of the signal transmitter(s) 102, such as on the basket support arm 62 and/or hanger 64 for one or more of the basket assemblies 54 and/or at any other suitable location.

In the illustrated embodiment, the system 100 is shown as including four antennas 104 spaced apart laterally along the aft end of the implement frame 28. However, in other embodiments, the system may include any other suitable number of antennas 104, such as three or less antennas (including a single antenna) or five or more antennas. In general, the exact number of antennas 104 used within the system 100, as well as the positioning and/or orientation of the antennas 104, will generally vary depending on the number, configuration, and/or positioning of the associated signal transmitter(s) 102. For instance, if a single signal transmitter 102 or a limited number of signal transmitters 102 is/are being used within the system 100, a single antenna 104 may be sufficient to detect the wireless signals transmitted from the signal transmitter(s) 102. However, if multiple signal transmitters 102 are installed at various different positions and/or orientations within each basket assembly 54, it may be desirable for the system 100 to include two or more antennas 104 to ensure that the wireless signals transmitted from each signal transmitter 102 are capable of being received by at least one of the antennas 104.

Figure 4:
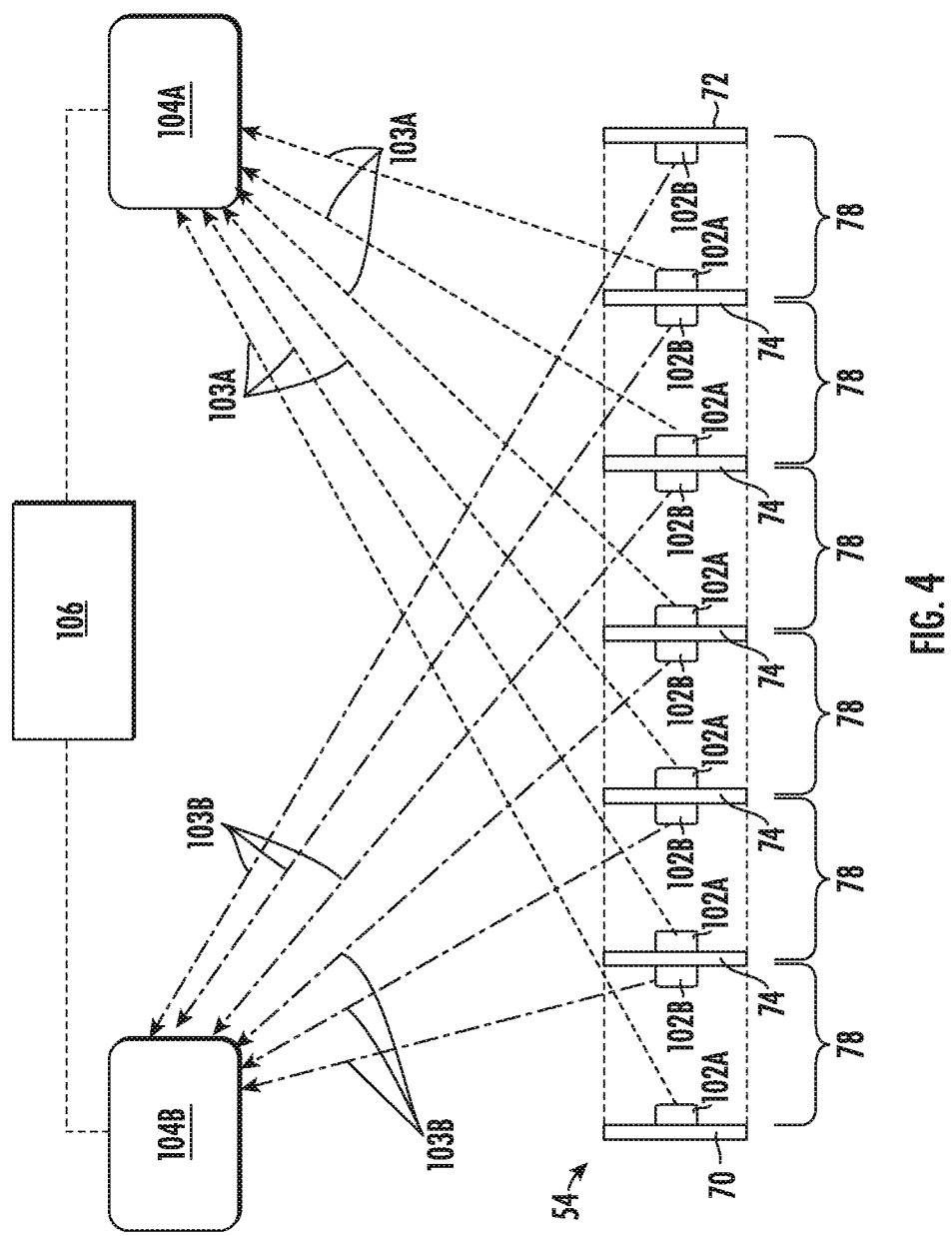
FIG. 4 illustrates a schematic view of an example system configuration in accordance with aspects of the present subject matter, particularly illustrating exemplary locations for signal transmitters of the disclosed system relative to a basket assembly of an agricultural implement, as well the relative positioning of associated antennas of the disclosed system.

Referring now to FIG. 4, a schematic view of an example transmitter/antenna configuration for the disclosed system 100 is illustrated in accordance with aspects of the present subject matter, particularly illustrating the locations of signal transmitters 100 installed relative to a basket assembly 54, as well the relative positioning of the associated antennas 104. For purposes of illustration, a simplified view of the basket assembly 54 is shown, particularly illustrating the blades/bars and the outer perimeter of the basket as a dashed box with the support plates 70, 72, 74 being spaced apart across the lateral width of the basket assembly 54.

As shown in FIG. 4, numerous signal transmitters 102 are installed within the basket assembly 54. Specifically, a plurality of first signal transmitters 102A are shown as being coupled to the first end plate 70 and the various inner support plates 74 along a first side of such support plates 70, 74 (e.g., the right side in the view of FIG. 4), while a plurality of second signal transmitters 102B are shown as being coupled to the second end plate 72 and the various inner support plates 74 along an opposed, second side of such support plates 72, 74 (e.g., the left side in the view of FIG. 4). In such an embodiment, each first signal transmitter 102A may, for example, be configured to transmit a suitable wireless signal(s) (as indicated by dashed arrows 103A) to a first antenna 104A spaced apart from the basket assembly 54 (e.g., by being installed on a separate component of the implement 10), while each second signal transmitter 102B may, for example, be configured to transmit a suitable wireless signal(s) (e.g., as indicated by dashed arrows 103B) to a second antenna 104B spaced apart from both the basket assembly 54 (e.g., by being installed on a separate component of the implement 10) and the first antenna 104A.

By including at least on signal transmitter 102 within each lateral basket section 78 of the basket assembly 54, material accumulation may be detected on a section-specific basis, thereby allowing the plugging status of each basket section 78 to be monitored individually. Moreover, in the illustrated embodiment, each lateral basket section 78 includes two signal transmitters 102 positioned therein, with each signal transmitter 102A, 102B being configured to wireless transmit signals to a respective antenna 104A, 104B. As such, in addition to allowing section-level monitoring of the material accumulation occurring across the lateral width of the basket assembly 54, the dual-transmitter configuration for each basket section 78 provides redundancy and also allows for the collected data to be verified to increase the confidence level in identifying a plugged condition for the basket assembly 54. For instance, if the wireless signals transmitted from the first antenna 102A mounted to the first end plate 70 appear to be attenuated or completely blocked as detected by the first antenna 104A (thereby indicating the associated basket section 78 is becoming plugged or is already plugged), the signals received from the second signal transmitter 102B mounted to the adjacent inner plate 74 may be referenced to confirm the existence of material accumulation within the associated basket section 78. If the signals transmitted from such second antenna 102B are similarly attenuated or blocked, it may be inferred with a high degree of confidence that material accumulation is occurring within the associated basket section 78. However, if the signals transmitted from the second signal transmitter 102B do not appear to be attenuated or blocked, it may be necessary or desirable to analyze the wireless signals received from both signal transmitters 102A, 102B over an additional period of time before determining whether it is likely that material accumulation is occurring within the associated basket section 78.

As shown in FIG. 4, each antenna 104A, 104B is communicatively coupled to an associated computing device or controller 106 of the system 100. As will be described below, the controller 106 may be configured to analyze the signals received by the antennas 104A, 104B (and/or data associated with the wireless signals) to assess the likelihood of the occurrence of material accumulation on or within the basket assembly 54. For instance, the controller 106 may identify when the signals from one or more of the signal transmitters 102 are attenuated or blocked, thereby providing an indication of plugging due to material accumulation.

It should be appreciated that the signal transmitter/antenna configuration shown in FIG. 4 is simply provided to illustrate one exemplary embodiment of a suitable system configuration in accordance with aspects of the present subject matter. However, as indicated above with reference to FIG. 3, in other embodiments, the disclosed system 100 may generally include any number of signal transmitters 102 and any number of associated antennas 104 positioned at any suitable location relative to the basket assembly 54 and/or relative to each other that allows such system components to function as described herein. For instance, in one alternative embodiment, the system 100 may simply include one or more of the first signal transmitters 102A and the associated first antenna 104A shown in FIG. 4 or may simply include one or more of the second signal transmitters 102B and the associated second antenna 104B shown in FIG. 4.

Figure 5:
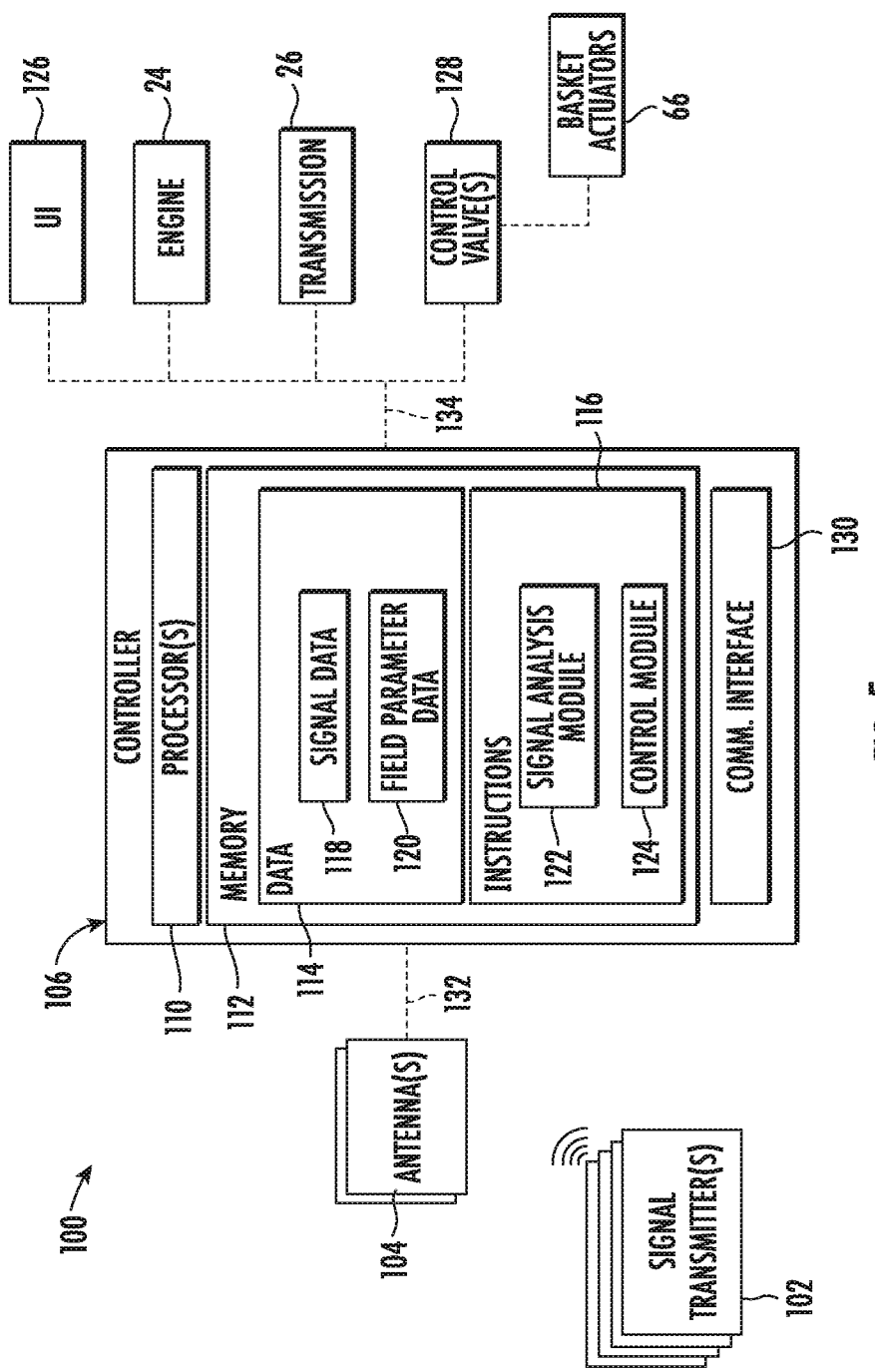
FIG. 5 illustrates a schematic view of one embodiment of a system for identifying plugging of ground engaging tools of an agricultural implement in accordance with aspects of the present subject matter.

Referring now to FIG. 5, a schematic view of one embodiment of a system 100 for identifying plugging of ground engaging tools of an agricultural implement is illustrated in accordance with aspects of the present subject matter. In general, the system 100 will be described with reference to the implement shown in FIGS. 1 and 2 and the basket assembly 54 and associated system components shown in FIGS. 3 and 4. However, in other embodiments, the disclosed system 100 may be utilized to identifying tool plugging in association with any other suitable agricultural implement having any other suitable implement configuration and/or with any other suitable ground engaging tool(s) having any other suitable tool configuration.

As indicated above, in several embodiments, the system 100 may include one or more signal transmitters 102 installed on, within, and/or adjacent to a ground engaging tool (e.g., a basket assembly 54) and one or more signal receivers or antennas 104 configured to receive the wireless signals transmitted from the signal transmitter(s) 104. Additionally, as indicated above, the system 100 may also include a controller 106 communicatively coupled to the antenna(s) 104. As will be described in greater detail below, the controller 106 may be configured to analyze the signals received by the antenna(s) 104 from the signal transmitter 102 (or the lack thereof) and/or related data associated with such signals to infer or estimate the existence of material accumulation on, within, and/or adjacent to the associated ground engaging tool. Additionally, the controller 106 may also be configured to execute one or more control actions in response to the determination that the associated ground engaging tool is likely plugged or in the process of becoming plugged. For instance, in one embodiment, the controller 106 may notify the operator that the tool is plugged or is likely to become plugged in the near future. In addition to notifying the operator (or as an alternative thereto), the controller 106 may be configured to execute one or more automated control actions adapted to de-plug the ground engaging tool or otherwise reduce the amount of material accumulation on, within, and/or adjacent to the tool, such as by automatically adjusting the speed of the implement 10 and/or the down force applied to the ground engaging tool and/or by automatically raising and lowering the ground engaging tool relative to the ground.

In general, the controller 106 may correspond to any suitable processor-based device(s), such as a computing device or any combination of computing devices. Thus, as shown in FIG. 5, the controller 106 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a signal database 118 for storing the signals received by the antennas(s) 104 from each signal transmitter 102 and/or data associated with the received signals. Specifically, in one embodiment, data associated with the signal strength of the signals received by the antennas(s) 104 may be stored within the signal database 118. For instance, signal strength data may be stored as a Received Signal Strength Indicator (RSSI) value for the wireless signals received from each signal transmitter 102. As will be described below, the RSSI value associated with the wireless signals received from a given signal transmitter 102 may be compared to one or more associated predetermined RSSI values or thresholds to facilitate the determination of whether the signals are attenuated due to material accumulation between such signal transmitter 102 and the associated antennas(s) 104.

Additionally, as shown in FIG. 3, the memory 12 may include a field parameter database 120 for storing information related to one or more parameters of the field being processed during the performance of the associated agricultural operation (e.g., a tillage operation). In one embodiment, moisture data associated with the moisture content or level of the soil within the field may be stored within the field parameter database 120. Specifically, the wetness or moisture content of the soil may impact the magnitude of the signal degradation or attenuation of the wireless signals being transmitted through adjacent material accumulation. For instance, material accumulation including significantly wet soil may attenuate the signals transmitted from an adjacent signal transmitter 102 to a greater degree than material accumulation including drier or less wet soil. Accordingly, by knowing the soil moisture within the field, the controller 106 may be configured to more accurately assess the signals received by the antennas(s) 104 from each signal transmitter 102.

It should be appreciated that the moisture data may be correspond to pre-existing or predetermined moisture data stored within the field parameter database 120 or the moisture data may correspond to sensor data that is being actively collected or generated during the performance of the associated agricultural operation. For instance, in one embodiment, the controller 106 may be provided with soil moisture data (e.g., in the form of a soil moisture map) that was collected during a previous agricultural operation or that was generated based on previously known data associated with the field conditions. Alternatively, a soil moisture sensor may be provided in operative association with the implement 10 or the towing vehicle 12 to allow the soil moisture to be actively monitored during the performance of the associated agricultural operation.

Referring still to FIG. 3, in several embodiments, the instructions 116 stored within the memory 112 of the controller 102 may be executed by the processor(s) 110 to implement a signal analysis module 122. In general, the signal analysis module 122 may be configured to analyze the signals received by the antenna(s) 104 from each signal transmitter 102 and/or the related signal data (or a lack thereof) to estimate or infer when the associated ground engaging tool is experiencing a plugged condition. Specifically, in several embodiments, the signal analysis module 122 may be configured to compare the signal strength of the wireless signals received from each signal transmitter 102 to one or more associated signal strength thresholds. For instance, in one embodiment various predetermined RSSI values may be stored within the controller's memory 112 for each signal transmitter 102, such as a first or non-plugged RSSI value corresponding to the expected RSSI value for the signals received from the signal transmitter 102 when the associated ground engaging tool is not plugged, a second or partially plugged RSSI value corresponding to the expected RSSI value for the signals received from the signal transmitter 102 when the associated ground engaging tool is partially plugged, and a third or fully plugged RSSI value corresponding to the expected RSSI value for the signals received from the signal transmitter 102 when the associated ground engaging tool is fully plugged. In such an embodiment, the controller 106 may be configured to continuously monitor the current RSSI value for the signals received from each signal transmitter 102 relative to the relevant predetermined RSSI value(s) defined for such signal transmitter 102 to assess the plugging status of the ground engaging tool (or at least the plugging status of the tool in the area of the associated signal transmitter 102). By doing so, the controller 106 may be configured to identify when the current RSSI value for a given signal transmitter 102 begins to decrease from the expected "non-plugged" RSSI value as the tool becomes plugged in the area adjacent to such signal transmitter 102. Once the current RSSI value drops below an associated plugging-related signal strength threshold (e.g., the partially plugged RSSI value described above), the controller 106 may then infer or estimate that the ground engaging tool is currently experiencing a plugged condition and may initiate appropriate control actions in response to the detection of the plugged condition.

Additionally, the controller 106 may be configured to identify the severity of any detected plugged condition based on a magnitude of the signal strength of the associated wireless signals. In this regard, by providing multiple plugging-related signal strength thresholds (e.g., the partially and fully plugged RSSI values described above), the controller 106 may infer or estimate the severity of the plugged condition by comparing the current RSSI value to each of such thresholds, which may impact the selection of the appropriate control action(s) to be executed (e.g., notifying the operator when it is detected that the tool is partially plugged versus performing an automated control action to adjust the operation of the implement when it is detected that the tool is fully plugged).

As indicated above, the magnitude of the attenuation or degradation of the signals deriving from each signal transmitter 102 may vary depending on the moisture content of the soil through which the signals are being transmitted. Thus, in several embodiments, a moisture correction factor may be applied to the plugging-related signal strength threshold(s) used to assess the current RSSI value associated with the signals received from each signal transmitter 102. For instance, a look-up table may be stored within the controller's memory 112 that correlates soil moisture values to corresponding moisture correction factors associated with the degree to which each moisture level degrade or attenuates the wireless signals. In such instance, by knowing the soil moisture within the field (e.g., via the soil moisture data stored within the field parameter database 120), an appropriate correction factor may be selected for modifying the signal strength threshold(s) to account for variations in the soil moisture. The modified signal strength threshold(s) may then be used to analyze the current RSSI value(s) for each signal transmitter 102 when assessing the plugging status of the associated ground engaging tool.

As indicated above, with certain plugging conditions (e.g., a fully plugged condition), the signals transmitted by one or more of the signal transmitters 102 may be completely blocked by the material accumulation on, within, and/or adjacent to the associated tool. In such instances, the signal analysis module 122 may also be configured to identify the lack of signals received from such signal transmitter(s) 102. For instance, the signal analysis module 122 may be configured to determine the source of each wireless signal received by an antenna(s) 104, such as by identifying a unique code or number (e.g., a serial number) transmitted from each signal transmitter 102. By doing so, the signal analysis module 122 may be configured to not only assess the signal strength of the signals received from each signal transmitter 102, but also determine when signals are not being received from a given signal transmitter(s) 102. Based on such a determination, the controller 106 may infer or estimate that the ground engaging tool is plugged at or adjacent to the area of the signal transmitter(s) 102 from which signals are not currently being received.

Referring still to FIG. 3, the instructions 116 stored within the memory 112 of the controller 102 may also be executed by the processor(s) 110 to implement a control module 124. In general, the control module 124 may be configured to initiate a control action when it is determined that a ground engaging tool of the implement 10 is experiencing a plugged condition. As indicated above, in one embodiment, the control module 124 may be configured to provide a notification to the operator of the vehicle/implement 12/10 indicating that material accumulation is present on, within, and/or adjacent to one or more of the ground engaging tools of the implement 10. For instance, in one embodiment, the control module 124 may causing a visual or audible notification or indicator to be presented to the operator via an associated user interface 126 provided within the cab 22 of the vehicle 10.

In other embodiments, the control module 124 may be configured to execute an automated control action designed to adjust the operation of the implement 10. For instance, in one embodiment, the controller 102 may be configured to increase or decrease the operational or ground speed of the implement 10 in an attempt to reduce the amount of material accumulation and/or to limit further material accumulation. For instance, as shown in FIG. 5, the controller 106 may be communicatively coupled to both the engine 24 and the transmission 26 of the work vehicle 12. In such an embodiment, the controller 106 may be configured to adjust the operation of the engine 24 and/or the transmission 26 in a manner that increases or decreases the ground speed of the work vehicle 12 and, thus, the ground speed of the implement 10, such as by transmitting suitable control signals for controlling an engine or speed governor (not shown) associated with the engine 24 and/or transmitting suitable control signals for controlling the engagement/disengagement of one or more clutches (not shown) provided in operative association with the transmission 26. It should be appreciated that controller 106 may also be configured to decrease the ground speed in a manner that brings vehicle/implement 12/10 to a complete stop.

In addition to the adjusting the ground speed of the vehicle/implement 12, 10 (or as an alternative thereto), the controller 102 may also be configured to adjust an operating parameter associated with the ground-engaging tools of the implement 10. For instance, as shown in FIG. 5, the controller 102 may be communicatively coupled to one or more valves 128 configured to regulate the supply of fluid (e.g., hydraulic fluid or air) to one or more corresponding actuators of the implement 10. In such an embodiment, by regulating the supply of fluid to the actuator(s), the controller 106 may automatically adjust the penetration depth, the down force, and/or any other suitable operating parameter associated with the ground-engaging tools of the implement 10. For instance, by controlling the operation of the basket actuators 66, the controller 106 may automatically adjust the down force or down pressure applied to the associated basket assembly 54. Additionally, the controller 106 may control the operation of the basket actuator 66 to raise and lower the associated basket assembly 54 relative to the ground.

Moreover, as shown in FIG. 5, the controller 106 may also include a communications interface 130 to provide a means for the controller 106 to communicate with any of the various other system components described herein. For instance, one or more communicative links or interfaces 132 (e.g., one or more data buses) may be provided between the communications interface 130 and the antenna(s) 104 to allow the signals received by the antenna(s) 104 (and/or related signal data) to be transmitted to the controller 106. Similarly, one or more communicative links or interfaces 134 (e.g., one or more data buses) may be provided between the communications interface 132 and the engine 24, the transmission 26, the user interface 126, the control valves 130 128, and/or the like to allow the controller 106 to control the operation of and/or otherwise communicate with such system components.

Figure 6:
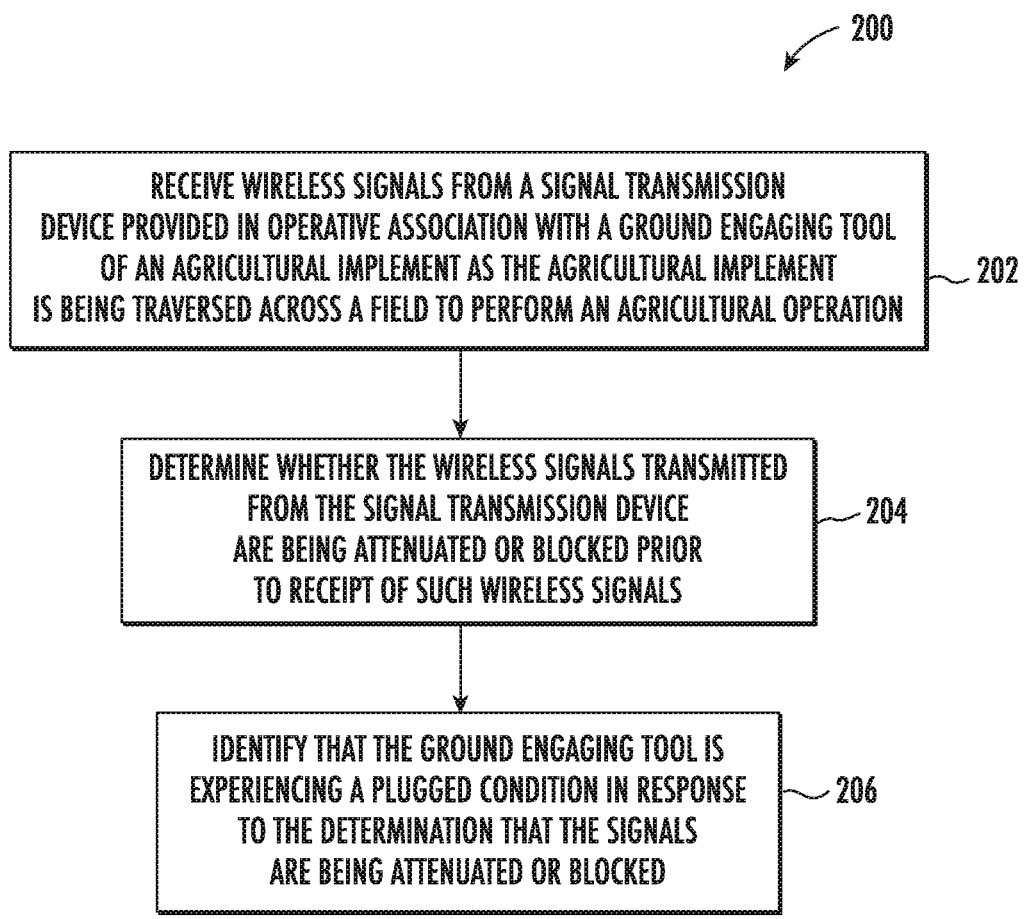
FIG. 6 illustrates a flow diagram of one embodiment of a method for identifying plugging of ground engaging tools of an agricultural implement in accordance with aspects of the present subject matter.

Referring now to FIG. 6, a flow diagram of one embodiment of a method 200 for identifying plugging of ground engaging tools of an agricultural implement is illustrated in accordance with aspects of the present subject matter. In general, the method 200 will be described herein with reference to the agricultural implement 10, the basket assembly 54, and the system 100 described above with reference to FIGS. 1-5. However, it should be appreciated by those of ordinary skill in the art that the disclosed method 200 may generally be implemented with any agricultural implement having any suitable implement configuration, any ground engaging tool having any suitable tool configuration, and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving wireless signals from a signal transmission device provided in operative association with a ground engaging tool of an agricultural implement as the agricultural implement is being traversed across a field to perform an agricultural operation. For instance, as described above with reference to FIG. 4, the wireless signals transmitted from each signal transmitter 102 installed within the basket assembly 54 may be received by an associated antenna(s) 104 and subsequently communicated to the associated system controller 106.

Additionally, at (204), the method 200 may include determining whether the wireless signals transmitted from the signal transmission device are being attenuated or blocked prior to receipt of such wireless signals. Specifically, as indicated above, the controller 106 may be configured to analyze the signals received by the antenna(s) 104 and/or signal data related to such signals to determine whether the signals are being attenuated or block (e.g., due to the present of material accumulation). For instance, in one embodiment, the controller 106 assess the signal strength of the signals received by the antenna(s) 104 (e.g., the RSSI value) to determine whether the signals have been attenuated prior to receipt by the antenna(s) 104.

Moreover, as shown in FIG. 6, at (206), the method 200 may include identifying that the ground engaging tool is experiencing a plugged condition in response to the determination that the signals are being attenuated or blocked. For instance, as indicated above, the controller 106 may be configured to infer or estimate that a ground engaging tool is experiencing a plugged condition when it is determined that the signals from an associated signal transmitter(s) 102 installed on, within, and/or adjacent to such tool are being attenuated or blocked.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for identifying plugging of ground engaging tools of an agricultural implement, the system comprising:
    a rotating basket assembly configured to be supported by an agricultural implement, the basket assembly defining an at least partially hollow interior within which field materials can accumulate;
    a signal transmission device provided in operative association with the basket assembly, the signal transmission device configured to transmit wireless signals;
    an antenna spaced apart from the signal transmission device and configured to receive the wireless signals transmitted from the signal transmission device; and
    a controller communicatively coupled to the antenna, the controller configured to determine when the basket assembly is experiencing a plugged condition based at least in part on at least one of an attenuation parameter of the wireless signals received by the antenna from signal transmission device or a lack of wireless signals received by the antenna from signal transmission device.

2. The system of claim 1, wherein the attenuation parameter comprises a signal strength of the wireless signals, the controller being configured to determine when the basket assembly is experiencing the plugged condition based at least in part on the signal strength of the wireless signals received by the antenna from the signal transmission device.

3. The system of claim 2, wherein the controller is configured determine when the basket assembly is experiencing the plugged condition by comparing the signal strength of the wireless signals received by the antenna to at least one predetermined signal strength threshold.

4. The system of claim 2, wherein the controller is further configured to determine a severity of the plugged condition based at least in part on a magnitude of the signal strength of the signals received by the antenna from the signal transmission device.

5. The system of claim 2, wherein the controller is configured to access moisture data associated with a moisture content of soil within a field in which the basket assembly is being used to perform an agricultural operation, the controller being configured to determine when the basket assembly is experiencing the plugged condition based at least in part on both the signal strength of the wireless signals received by the antenna from the signal transmission device and the moisture data.

6. The system of claim 1, wherein the signal transmission device is installed relative to the basket assembly such that the wireless signals transmitted from the signal transmission device to the antenna are at least one of attenuated or blocked when the basket assembly is experiencing the plugged condition.

7. The system of claim 1, wherein the basket assembly comprises a plurality of support plates and a plurality of bars supported by the plurality of support plates, the signal transmission device being coupled to a support plate of the plurality of support plates.

8. The system of claim 7, wherein the plurality of support plates comprise first and second end plates positioned at opposed first and second lateral ends, respectively, of the basket assembly and a plurality of inner support plates spaced apart laterally from one another between the first and second end plates, the signal transmission device being coupled to an inner support plate of the plurality of internal support plates.

9. The system of claim 1, wherein the basket assembly comprises a plurality of lateral basket sections, with each lateral basket section being defined between adjacent support plates of the basket assembly, and wherein the signal transmission device comprises one of a plurality of signal transmission devices installed relative to the basket assembly, at least one signal transmission device of the plurality of signal transmission devices being positioned within each lateral basket section of the plurality of lateral basket sections of the basket assembly.

10. The system of claim 9, wherein the controller is further configured to determine when a given lateral basket section of the plurality of lateral basket sections is experiencing a plugged condition by identifying when the wireless signals from the at least one signal transmission device positioned within such lateral basket section are at least one of attenuated or blocked.

11. The system of claim 1, wherein the signal transmission device comprises one of a plurality of signal transmission devices provided in operative association with the basket assembly, wherein the antenna comprises a first antenna and further comprising a second antenna spaced apart from the first antenna and communicatively coupled to the controller, the first antenna being configured to receive wireless signals transmitted by at least one first signal transmission device of the plurality of signal transmission devices and the second antenna being configured to receive wireless signals transmitted by at least one second signal transmission device of the plurality of signal transmission devices.

12. The system of claim 1, wherein the signal transmission device comprises an RFID tag.

13. An agricultural implement, comprising:
    a frame;
    a rotating basket assembly configured to be supported by the frame, the basket assembly defining an at least partially hollow interior within which field materials can accumulate;
    a signal transmission device provided in operative association with the basket assembly, the signal transmission device configured to transmit wireless signals;
    an antenna spaced apart from the signal transmission device and configured to receive the wireless signals transmitted from the signal transmission device; and
    a controller communicatively coupled to the antenna, the controller configured to determine whether the basket assembly is experiencing a plugged condition by identifying when the wireless signals transmitted from the signal transmission device to the antenna are at least one of attenuated or blocked.

14. A method for identifying plugging of ground engaging tools of an agricultural implement, the method comprising:
    receiving wireless signals from a signal transmission device provided in operative association with a rotating basket assembly of an agricultural implement as the agricultural implement is being traversed across a field to perform an agricultural operation, the basket assembly defining an at least partially hollow interior within which field materials can accumulate;
    determining, with a computing device, whether the wireless signals transmitted from the signal transmission device are being attenuated or blocked prior to receipt of such wireless signals; and identifying, with the computing device, that the basket assembly is experiencing a plugged condition in response to the determination that the wireless signals are being attenuated or blocked.

15. The method of claim 14, further comprising controlling an operation of the agricultural implement to adjust an operating parameter associated with the agricultural implement when it is identified that the basket assembly is experiencing the plugged condition.

16. The method of claim 14, further comprising notifying an operator of the agricultural implement when it is identified that the basket assembly is experiencing the plugged condition.

17. The method of claim 14, wherein determining whether the wireless signals are being attenuated or blocked prior to receipt of such wireless signals comprises determining whether the wireless signals are being attenuated based at least in part on a signal strength of the wireless signals.

18. The method of claim 17, wherein determining whether the wireless signals are being attenuated comprises determining whether the wireless signals are being attenuated based at least in part, on the signal strength of the wireless signals and moisture data associated with a moisture content of soil within the field.

19. The method of claim 14, wherein the signal transmission device comprises an RFID tag installed within the basket assembly.

20. The system of claim 1, wherein the signal transmission device is installed on or within the basket assembly such that the signal transmission device rotates with the basket assembly during operation of the agricultural implement.

* * * * *